United States Patent [19]

Massey

[11] Patent Number: 5,384,563

[45] Date of Patent: Jan. 24, 1995

[54] METHOD AND APPARATUS FOR TIME SYNCHRONIZATION OF BUS TYPE LOCAL AREA NETWORKS INCLUDING HIERARCHICAL NETWORKS

[75] Inventor: W. Russell Massey, Levittown, Pa.

[73] Assignee: Honeywell Inc., Minneapolis, Minn.

[21] Appl. No.: 19,730

[22] Filed: Feb. 22, 1993

[51] Int. Cl.6 ............................................. H04Q 1/00
[52] U.S. Cl. ........................ 340/825.21; 340/825.14; 340/825.2
[58] Field of Search .......... 340/825.21, 825.2, 825.14; 370/100.1, 100.3; 375/107; 368/52, 55

[56] References Cited

U.S. PATENT DOCUMENTS

| | | | |
|---|---|---|---|
| 4,337,463 | 6/1982 | Vangen | 340/825.2 X |
| 4,411,007 | 10/1983 | Rodman et al. | 375/107 |
| 4,736,393 | 4/1988 | Grimes et al. | 375/107 |
| 4,860,001 | 8/1989 | Yamanaka et al. | 340/825.2 |

*Primary Examiner*—Donald J. Yusko
*Assistant Examiner*—Edwin C. Holloway, III

*Attorney, Agent, or Firm*—Arthur A. Sapelli; William Udseth; A. Medved

[57] ABSTRACT

The time of a second network is synchronized to a first network, each network having an independent timing subsystem, includes the following steps. The first network sends a first message to the second network, the first message being uniquely identified as a sync message. A first relative time is obtained within the first network of when the first message is transmitted. When the first network recognizes that the first message was sent, a second relative time is obtained to send a second message to the second network containing a real time of the first network that the first message was sent. The second network obtains a third relative time within the second network of when the first message is received. The real time of the first network contained in the second message is associated to the third relative time of the second network, thereby synchronizing the time of the second network to the time of the first network. Any skew of time associated with transmission protocols of the first and second network is thereby eliminated.

5 Claims, 8 Drawing Sheets

| ITEM | DESCRIPTION |
|------|-------------|
| SD | START DELIMITER BYTE — FLAGS START OF MSG |
| MAC FC | MAC FRAME CONTROL BYTE — DEFINES TYPE OF MSG TO BE TYPE 1 PRIORITY 6 MULTICAST. |
| DEST ADDR | THE 48-BIT DESTINATION ADDRESS FOR THE FRAME. THE FIRST-TRANSMITTED BIT (BIT 0) IS ALWAYS ONE. ONE OF THE REMAINING 47 BITS IS SET, TO IDENTIFY THE MULTICAST GROUP. THIS EXAMPLES SHOWS BIT 7 SET. |

METHOD AND APPARATUS FOR TIME SYNCHRONIZATION OF BUS TYPE LOCAL AREA NETWORKS INCLUDING HIERARCHICAL NETWORKS

BACKGROUND OF THE INVENTION

The invention relates to communications systems, and more particularly, to a method and apparatus for providing time synchronization of data transmitted between devices of a bus type local area network, including hierarchical networks.

On a bus type local area network messages ideally appear at receiving nodes as soon as transmitted, without variable delays caused by intermediary devices (propagation delays are not generally significant). Bus type networks include networks having bounded propagation delays such as induced by repeaters, and further including hierarchical network structures. Typically, however, such networks are software-driven and have variable/unpredictable delays in the network hardware and software between the time messages are queued for transmission and actually transmitted, and between the time messages are received and actually processed. This lack of determinism prevents synchronization or time broadcast via messages containing high-precision clock times. Such networks do not provide for high-resolution clock synchronization in their standard definitions. Additionally, the available network interface products do not provide this feature, nor the ability to recognize a predefined, unique, synchronization message, to enable external synchronization processing.

Thus there is a need to provide, in bus type networks, a technique for determining the difference between the time messages are queued and actually transmitted, and the difference between the time messages are received and actually processed.

SUMMARY OF THE INVENTION

Therefore, there is provided by the present invention, a method and apparatus for determining the difference between the time messages are queued for transmission and actually transmitted, and between the time messages are received and actually processed, thereby achieving time synchronization of the data transmitted between devices of a bus type local area network, including hierarchical networks. The present invention provides a method for synchronizing the time of a second network to a first network, each network having an independent timing subsystem for maintaining its own real time, comprises the following steps. The first network sends a first message to the second network, the first message being uniquely identified as a sync message. A first relative time is obtained within the first network of when the first message is transmitted. When the first network recognizes that the first message was sent, a second relative time is obtained to send a second message to the second network containing a real time of the first network that the first message was sent. The second network obtains a third relative time within the second network of when the first message is received. The real time of the first network contained in the second message is associated to the third relative time of the second network, thereby synchronizing the time of the second network to the time of the first network. Any skew of time associated with transmission and reception protocols of the first and second network is thereby eliminated.

Accordingly, it is an object of the present invention to provide a method and apparatus for providing time synchronization of information transmitted between devices of a bus type network.

It is another object of the present invention to provide a method and apparatus for providing time synchronization of information transmitted between devices of a bus type network including hierarchical networks.

It is still another object of the present invention to provide a method and apparatus for providing time synchronization of information transmitted between devices of a bus type network by determining the difference between the time the information to be transmitted (message) is queued and actually transmitted, and the difference between the time messages are received and actually processed, and using those differences to eliminate the effect of skews due to the protocols.

These and other objects of the present invention will become more apparent when taken in conjunction with the following description and attached drawings, wherein like characters indicate like parts, and which drawings form a part of the present application.

DETAILED DESCRIPTION

Figure 1:
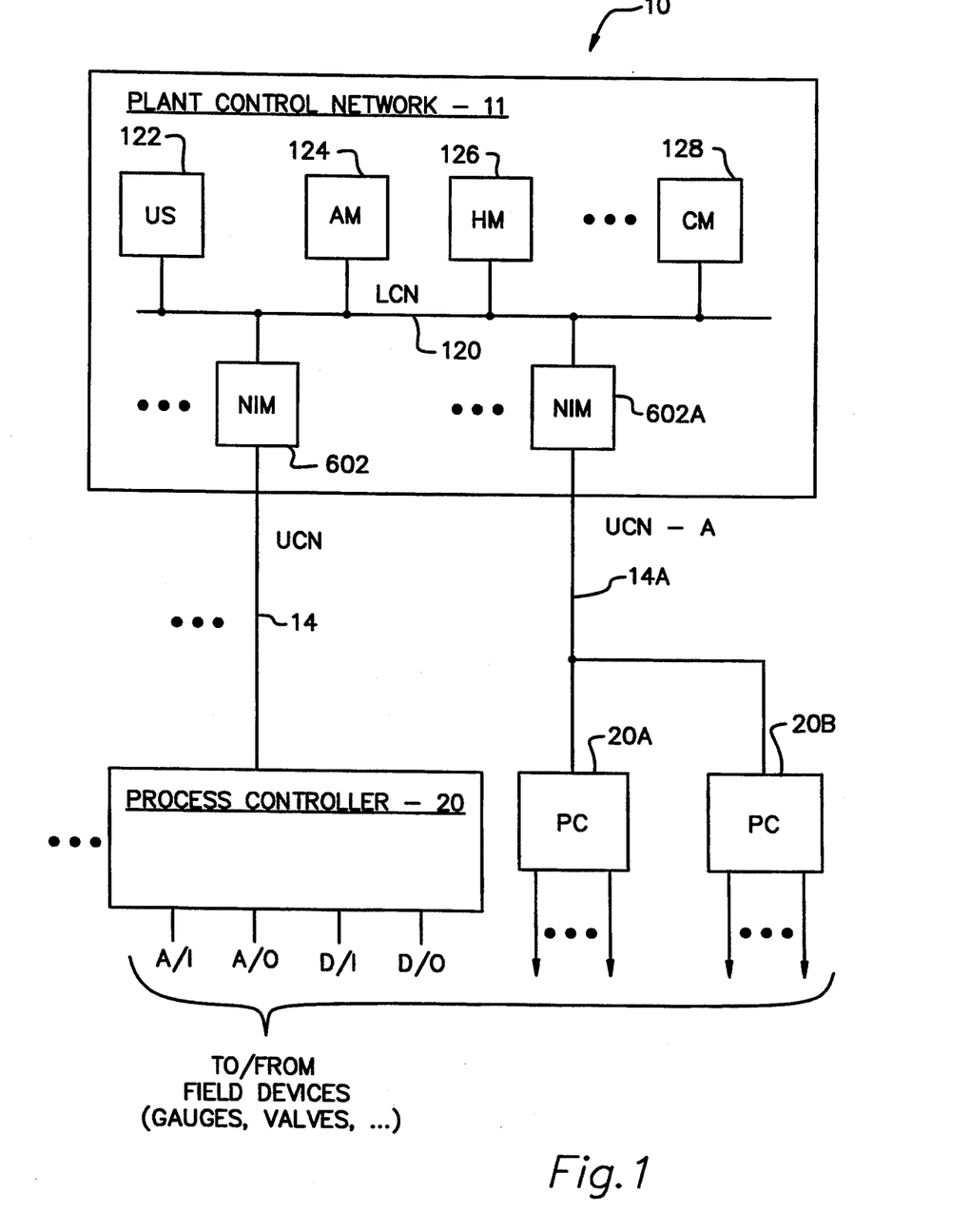
FIG. 1 shows a block diagram of a process control system in which the present invention can be utilized.

Before describing the method and apparatus of the present invention, it will be helpful in understanding a system environment in which the present invention can be utilized. Referring to FIG. 1, there is shown a block diagram of a process control system 10 in which the present invention can be found. The process control system 10 includes a plant control network 11, in which a process controller 20 is operatively connected to the plant control network 11 via a universal control network (UCN) 14 to a network interface module (NIM) 602. In the preferred embodiment of the process control system 10, additional process controllers 20 can be operatively connected to the plant control network 11 via the same UCN 14, and additional UCNs 14 can be added to the plant control network 11 via additional corresponding NIMs 602. The process controller 20, interfaces analog input and output signals, and digital input and output signals (A/I, A/O, D/I, and D/O, respectively) to the process control system 10 from the variety of field devices (not shown) which include valves, pressure switches, pressure gauges, thermocouples, . . . .

The plant control network 11 provides the overall supervision of a controlled process, in conjunction with the plant operator, and obtains all the information needed to perform the supervisory function, and includes an interface with the operator. The plant control network 11 includes a plurality of physical modules, which include a universal operator station (US) 122, an application module (AM) 124, a history module (HM) 126, a computer module (CM) 128, and duplicates of these modules (and additional types of modules, not shown) as necessary to perform the required control/supervisory function of the process being controlled. Each of these physical modules is operatively connected to a local control network (LCN) 120 which permits each of these modules to communicate with each other as necessary. The NIM 602 provides an interface between the LCN 120 and the UCN 14. A more complete description of the plant control network 11, and the physical modules can be had by reference to U.S. Pat. No. 4,607,256.

Figure 2:
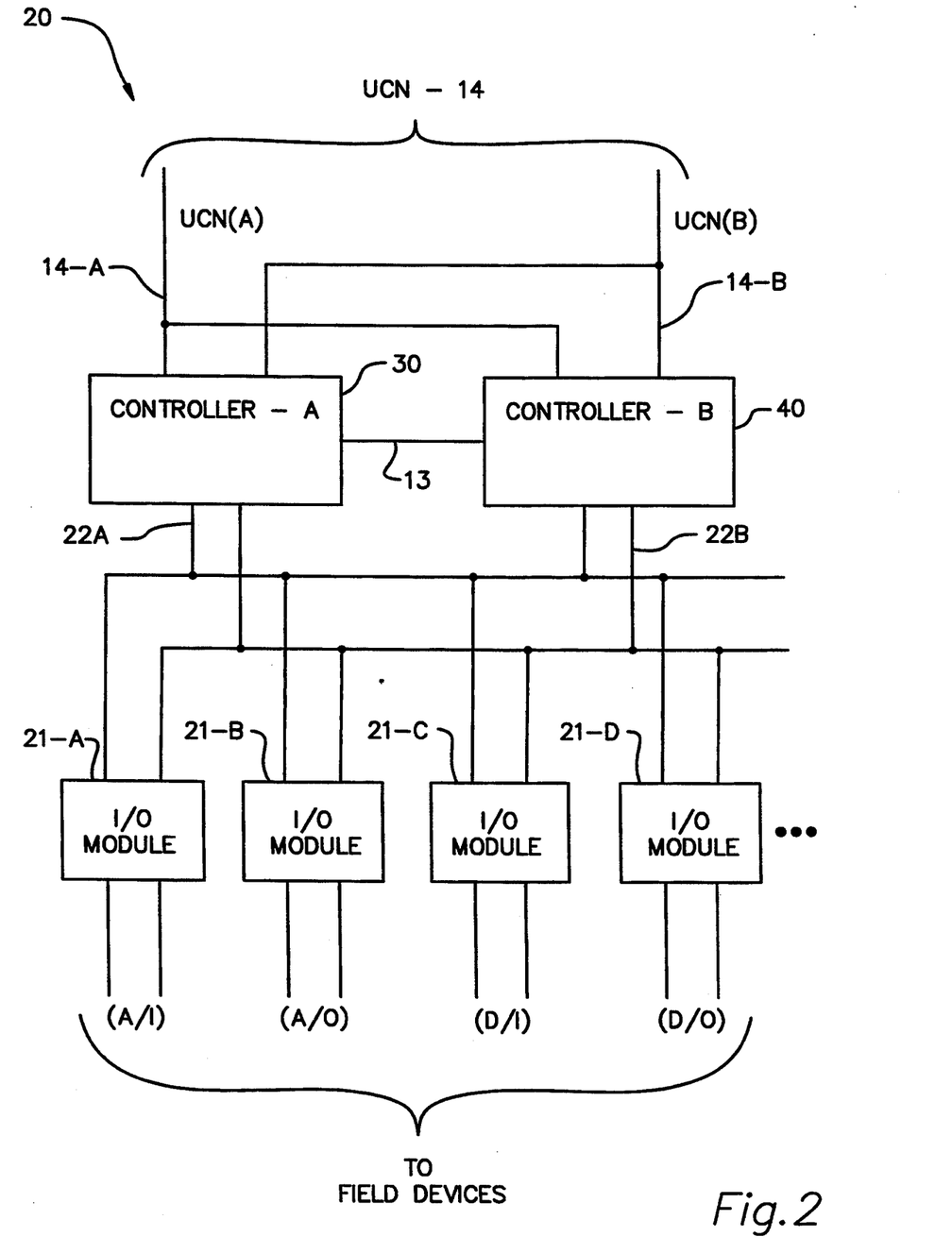
FIG. 2 shows a block diagram of a process controller, including I/O modules (IOP), in which the present invention can be utilized.

Referring to FIG. 2 there is shown a block diagram of the process controller 20. The process controller 20 of the preferred embodiment of the process control system 10 includes a controller A 30 and a controller B 40, which effectively operate as a primary and secondary controller. Controller A 30 and controller B 40 are connected to the UCN 14, the UCN 14 in the preferred embodiment, comprising for communication redundancy purposes, a UCN(A) 14A and a UCN(B) 14B. Input/output processors (IOPs) (sometimes referred to herein as input output (I/O) modules) 21 interface to field devices, field devices being various valves, pressure switches, pressure gauges, thermocouples, . . . which can be analog inputs (A/I), analog outputs (A/O), digital inputs (D/I), and digital outputs (D/O). The controller A 30 and controller B 40 interface to one or more I/O modules via a bus 22, the bus 22 in the preferred embodiment, comprising for communication redundancy purposes, a bus 22A and a bus 22B.

Controller A and controller B, 30, 40, can communicate with each other via three mediums, the UCN 14, a link 13 between the controllers, and the buses 22A, 22B, with bus 22A and bus 22B in the preferred embodiment being serial I/O links. One controller (controller A 30 or controller B 40) operates as a primary controller and the other controller operates as a secondary controller (in more of a reserve mode than a back-up, in that if a failure of controller A 30 should occur, controller B is ready to take over the control function with essentially no start-up or initialization time). On a predetermined time basis, point processing is performed by the controller designated as the primary controller and communicates with the I/O modules 21. In addition, the controller acting as the primary controller communicates with the plant control network 11 reporting status, history, and accepting inputs from the plant control network such as commands from the operator via the universal station 122. In addition, a data base maintained by the primary controller is communicated to the secondary controller via link 13. As mentioned above, one controller operates as a secondary controller; however, it will be understood by those skilled in the art that a secondary controller is not necessary for the process controller 20.

Figure 3:
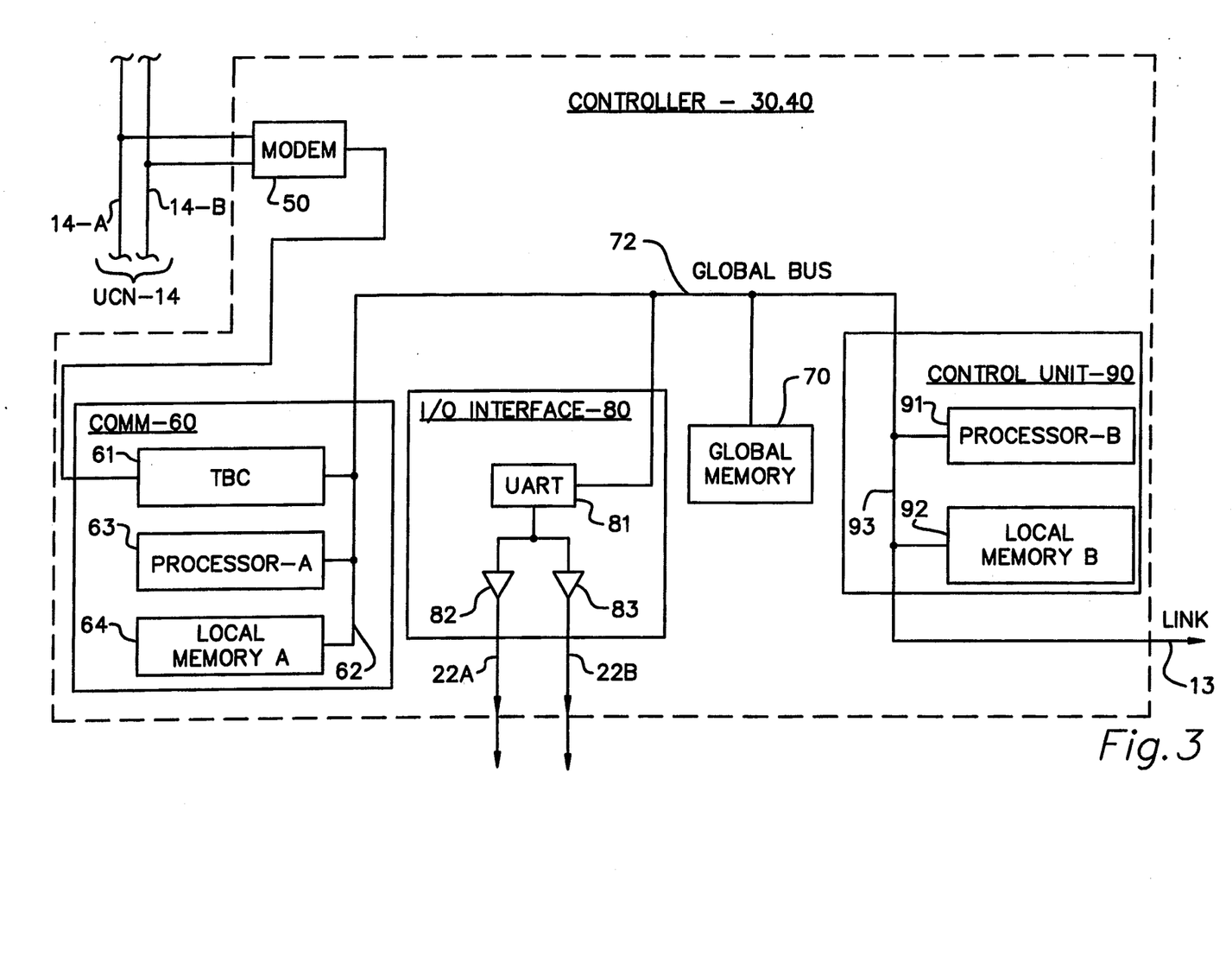
FIG. 3 shows a block diagram of a controller which is included in the process controller of FIG. 2.

Referring to FIG. 3, there is shown a block diagram of the controller 30, 40. A modem 50 is connected to the UCN 14, the modem having two inputs, one connected to UCN 14A and the other connected UCN 14B. The modem 50 interfaces with a communication unit (COMM) 60 which in turn interfaces with a global memory 70, an I/O interface unit 80, and a control unit 90 via global bus 72. The communication unit 60 includes a communication control unit, in the preferred embodiment a token bus controller (TBC) 61, Motorola type 68824, which is connected to a local bus 62. A processor A 63 (which essentially performs the communication function) is connected to the local bus 62, and a local memory A 64, which is also connected to the local bus 62. The processor A 63 communicates with the plant control network 11 via modem 50 and TBC 61. The local memory A 64 stores information, including personality image which is downloaded from the plant control network 11, for use by processor A 63 and TBC 61. The global memory 70 stores information which is common to both processor A 63 and a processor B 91. It also stores all the data received from bus 22A and bus 22B. The global memory 70 also serves as an interprocessor communication vehicle between the processors A 63 and B 91. Control unit 90 includes the processor B 91 and a local memory B 92, both connected to a local bus 93. Processor B 91 performs the control function (i.e., control processing) relating to the field devices. This essentially includes performing the point processing, and updating the local memory B 92 and global memory 70. Also coupled to the local bus 93 of control unit 90 is a track unit (not shown) which is utilized to implement the data base transfer via link 13 to the other controller 30, 40 of the process controller 20.

The I/O interface unit 80 includes a receiver-transmitter device, this device being a UART (Universal Asynchronous Receiver/Transmitter) 81. The UART 81 is coupled through drivers 82, 83 to bus 22A and bus 22B, respectively.

Processor B 91 receives data from the various field devices through global memory 70, performs the necessary point processing and control function, and then updates the local memory B 92 and global memory 70, as required. The communication unit 60, in response to commands from the control unit 90 via global memory 70, inputs and outputs data between the I/O modules 21 (via the I/O interface unit 80) and the global memory 70, thereby relieving the control unit 90 from the burden of I/O module management. In this manner the control processing is performed by the control unit 90 within the process controller 20 for the predefined attached field devices, and the communication (i.e., the I/O control) is handled by the communication unit 60 through the UART 81.

Figure 4:
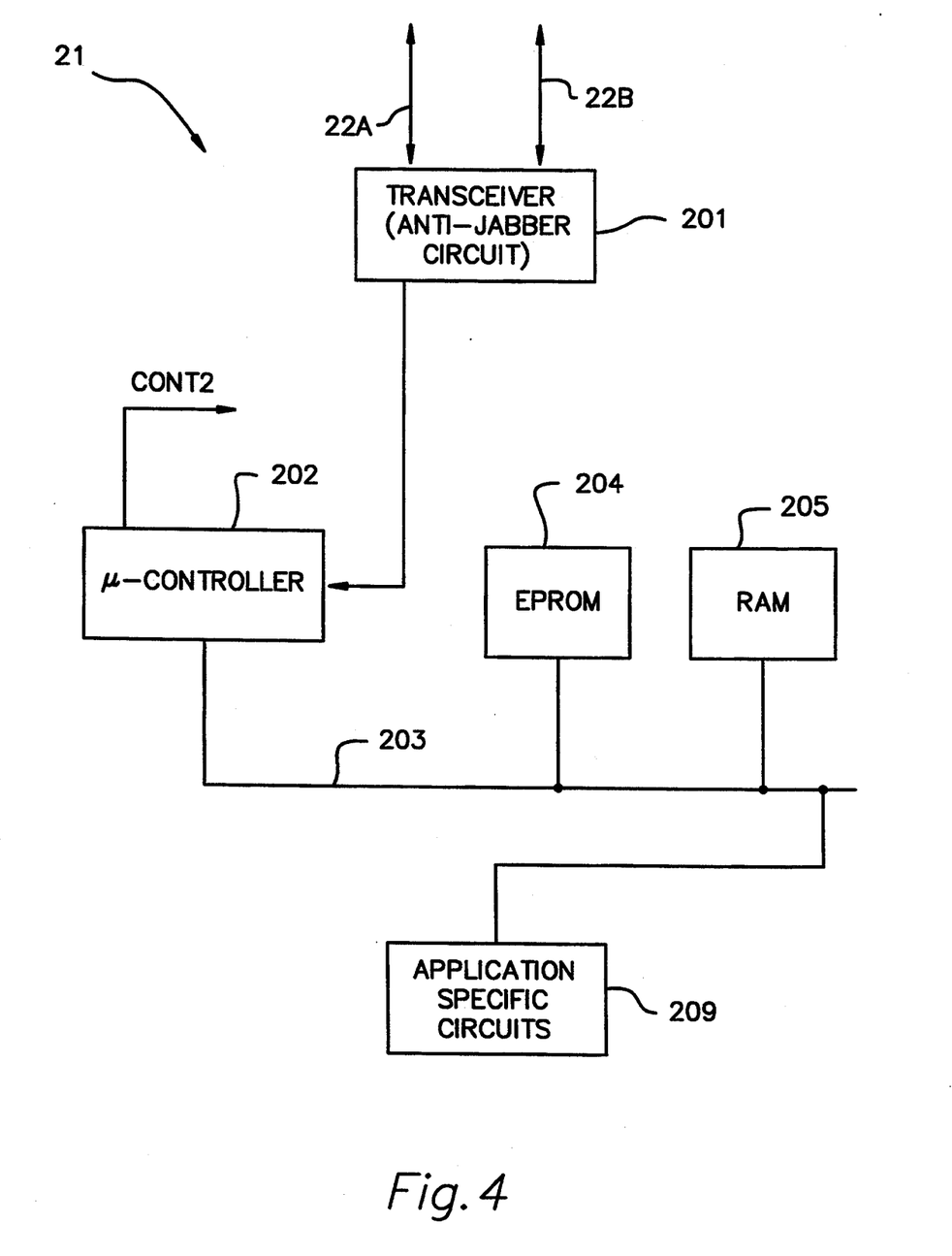
FIG. 4 shows a block diagram of an I/O module which is included in the process controller of FIG. 2.

Referring to FIG. 4 there is shown a partial block diagram of an I/O module of the components of interest. A transceiver (anti-jabber circuit) 201 interfaces with bus 22A and bus 22B. The transceiver 201 interfaces with a microcontroller (u-controller) 202 which, in the preferred embodiment, is of the type, Intel 80C31. The microcontroller is coupled to a local bus 203, and includes an EPROM 204 and a RAM 205 also connected to the local bus 203. The RAM 205 contains the information which forms the database for the I/O module 21. The EPROM 204 contains the program information utilized by the microcontroller 202. The application specific circuits 209 are also connected to the local bus 203, and the microcontroller 202 via the local bus 203. The application specific circuits 209 vary from I/O module to I/O module depending on the field device to which the I/O module is to be coupled. If the field device is of a type which requires a digital input, then the application specific circuit 209 will include the logic in order to place the digital input into a predefined format which will interface with the remainder of the I/O module. Likewise, if the field device is such that requires an analog input, then the application specific circuit contains logic which converts the analog input signal (via an A/D converter) into a format again consistent with predefined formats. In this manner, the I/O modules are referred to as a specific I/O module type. The microcontroller 202 performs the I/O processing (or preprocessing) for the application specific circuits 209. The preprocessing will vary from each I/O module 21 depending on the type (i.e., A/I, A/O,...) the preprocessing essentially consisting of translating the signals from the application specific circuits to a format compatible with the controller 30, 40, and putting the signals from controller 30, 40 in a format compatible with the I/O module 21. Some of the preprocessing performed includes zero drift, linearization (linearizing thermocouples), hardware correction, compensation (gain compensation and zero compensation), reference junction compensation, calibration correction, conversions, checking for alarms (limits) . . . and generating a signal in a predetermined format having predetermined scale (i.e., engineering units, normalized units, percent of scale,...). In the preferred embodiment seven types of applications specific circuits are provided for, these include a high level analog input, low level analog input, analog output, digital input, digital output, smart transmitter interface, and pulse input counter.

Figure 5:
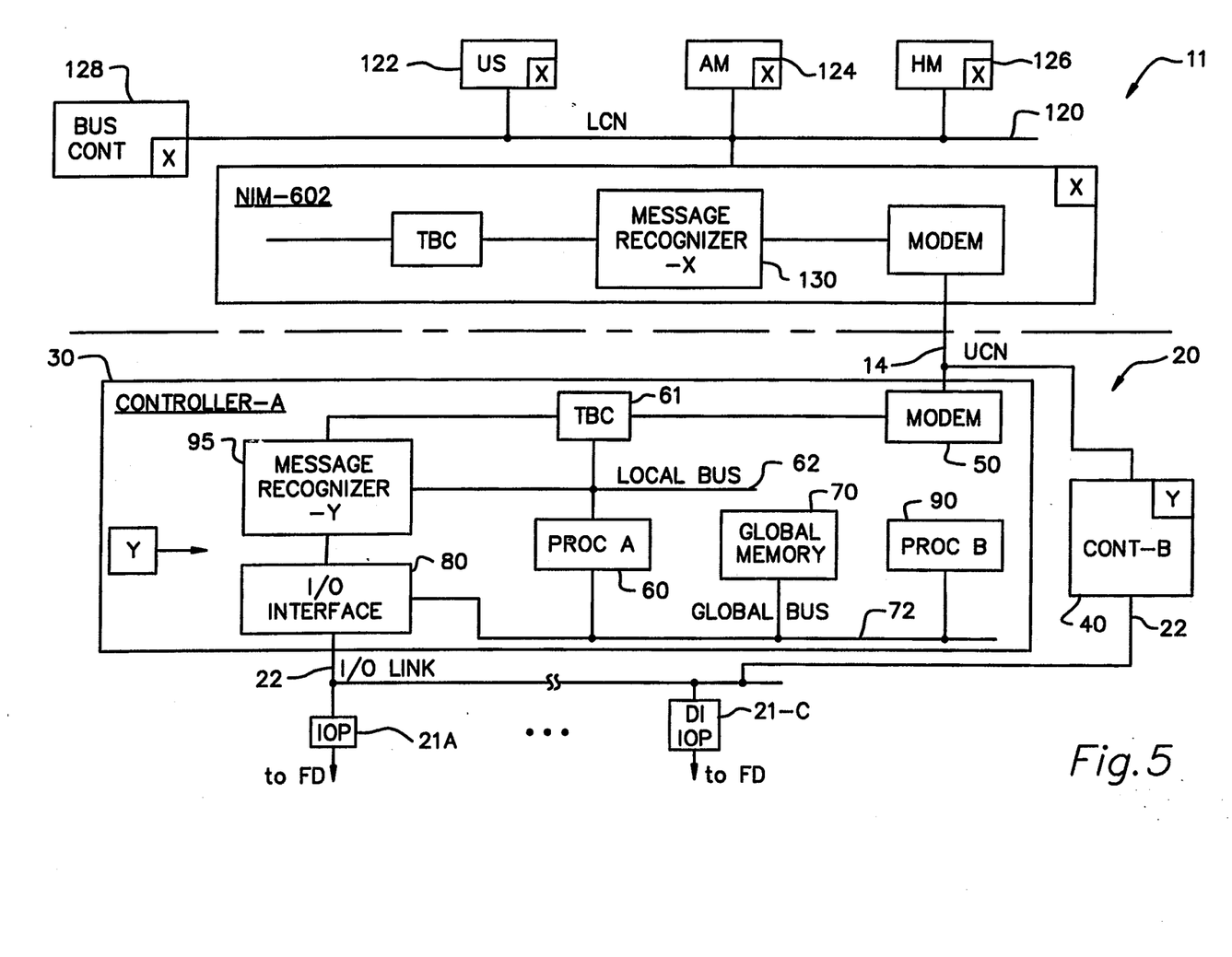
FIG. 5 shows a block diagram of the preferred embodiment of the process control system which includes the present invention.

Referring to FIG. 5, there is shown a block diagram of the preferred embodiment of the process control system 10 which includes the present invention. The NIM 602 of the plant control network 11 includes a message recognizer-X 130, and controller A 30 and the redundant controller B 40 if applicable, of the process controller 20, each include a message recognizer-Y 95.

Figure 6:
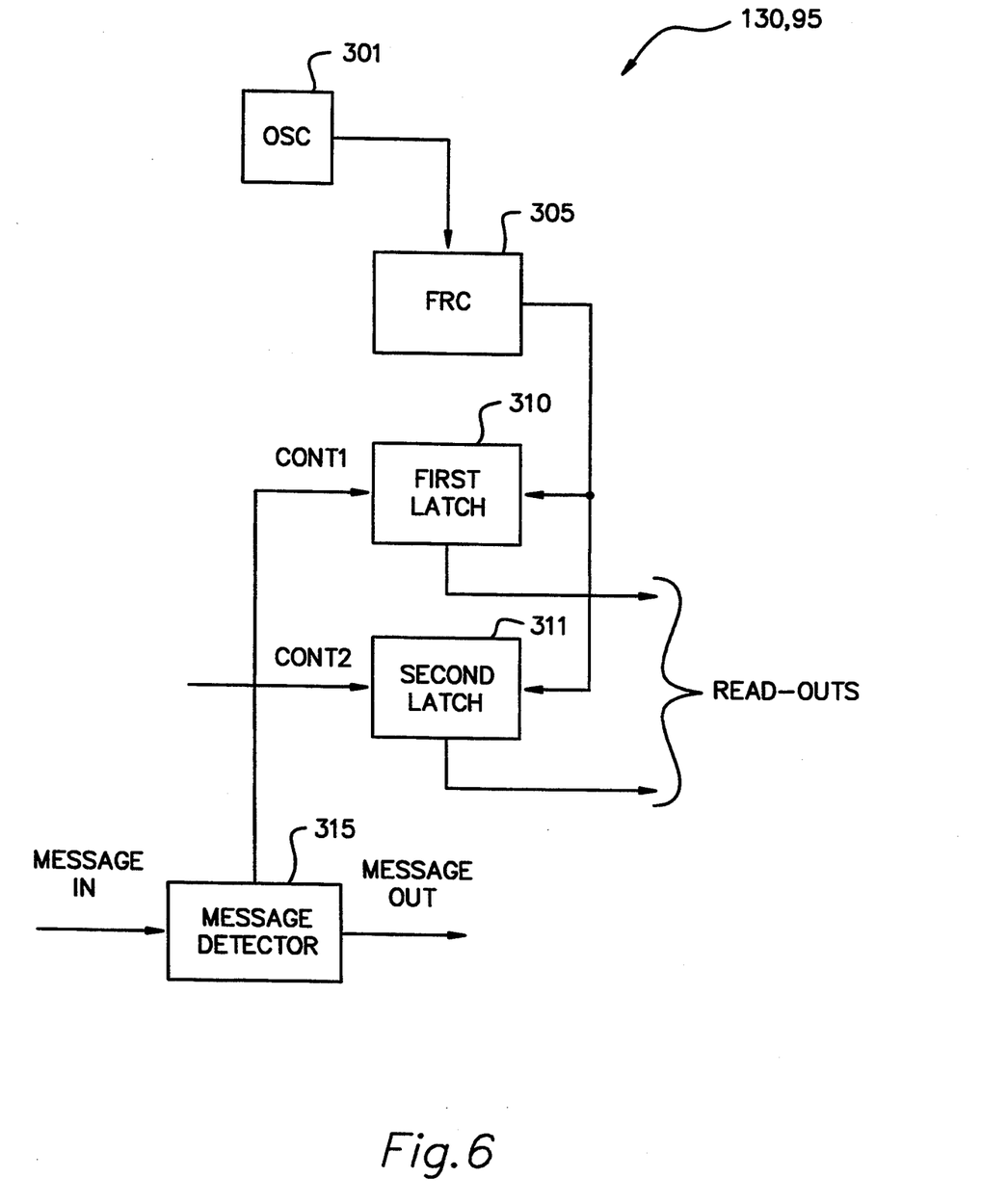
FIG. 6 shows a block diagram of a message recognizer of the preferred embodiment of the present invention.
Figure 7:
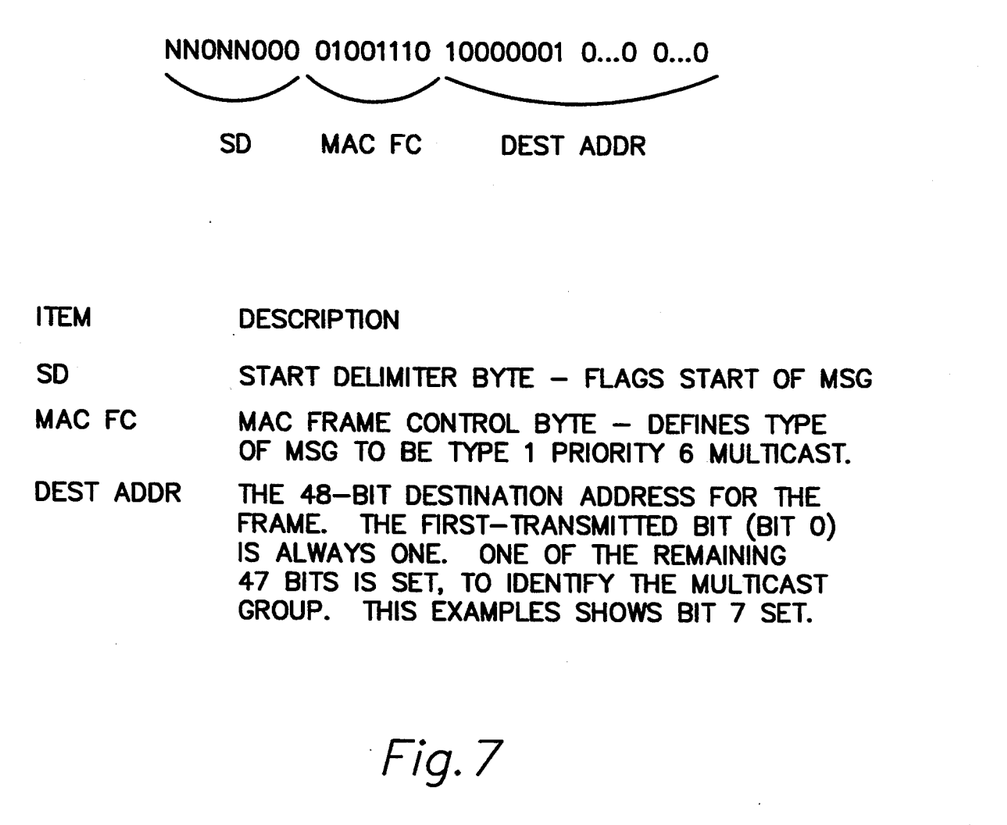
FIG. 7 shows the format of an IEEE 802.4 message detector pattern.

Referring to FIG. 6, there is shown a block diagram of the message recognizer 130, 95. An oscillator 301 drives a free running counter (FRC) 305. A first and second latch 310, 311 is included and permits the contents of the FRC 305 to be stored in the latches upon command. A message detector 315 samples the messages being transmitted or received. The message detector 315 provides the first control signal, CONT 1, which latches the contents of the free running counter 305 into the first latch 310 when a unique header of a synchronization message is transmitted or received. This latching is essentially simultaneous in all devices on the same network bus and provides the basis for all subsequent synchronization activities. No other types of messages latch the free running counter 305. The second latch 311 of the message recognizer 130, 95 is used in various ways to provide the accurate synchronization times required for various applications of the present invention. In the preferred embodiment of the present invention a second control signal, CONT 2, is provided to cause the second latch 311 to latch upon a predetermined software command. The control of the second latch will be explained in further detail hereinunder. The first and second latches 310, 311 are both readable by a corresponding computer included in the network. The length and resolution of the free running counter 305 and the latches are determined by the time resolution desired, the synchronization interval, and other factors well known by those skilled in the art. Although the preferred embodiment of the present invention utilizes the IEEE 802.4 communication scheme, other communication protocols can be used, including the IEEE 802.5 Ethernet, as will be well recognized by one skilled in the art. FIG. 7 shows the format of the IEEE 802.4 message detector pattern.

Referring back to FIG. 5, the method of time synchronization will now be described. The time (i.e., real time in digital format in terms of hours, minutes, seconds) within the plant control network 11 is referred to as "LCNTIME". The time is generated by timing subsystems of each of the physical modules 122, 124, 126, and the NIM 602 (the NIM being a node coupled to the LCN 120). The timing subsystems of each of the physical modules are denoted by the letter X. The clock-X maintained by each of the physical modules are all the same, the clocks being synchronized under control of a bus controller 128, in a manner well understood by those skilled in the art; specifically, the manner is described in U.S. Pat. No. 4,890,222, "Apparatus for substantially synchronizing the timing subsystem of the physical modules of a local area network", the patent being assigned to the same assignee of the present application.

The controllers 30, 40 each have their respective timing subsystems, denoted as Y, which has a controller time, CONTIME, which can be skewed from the LCNTIME.

Figure 8:
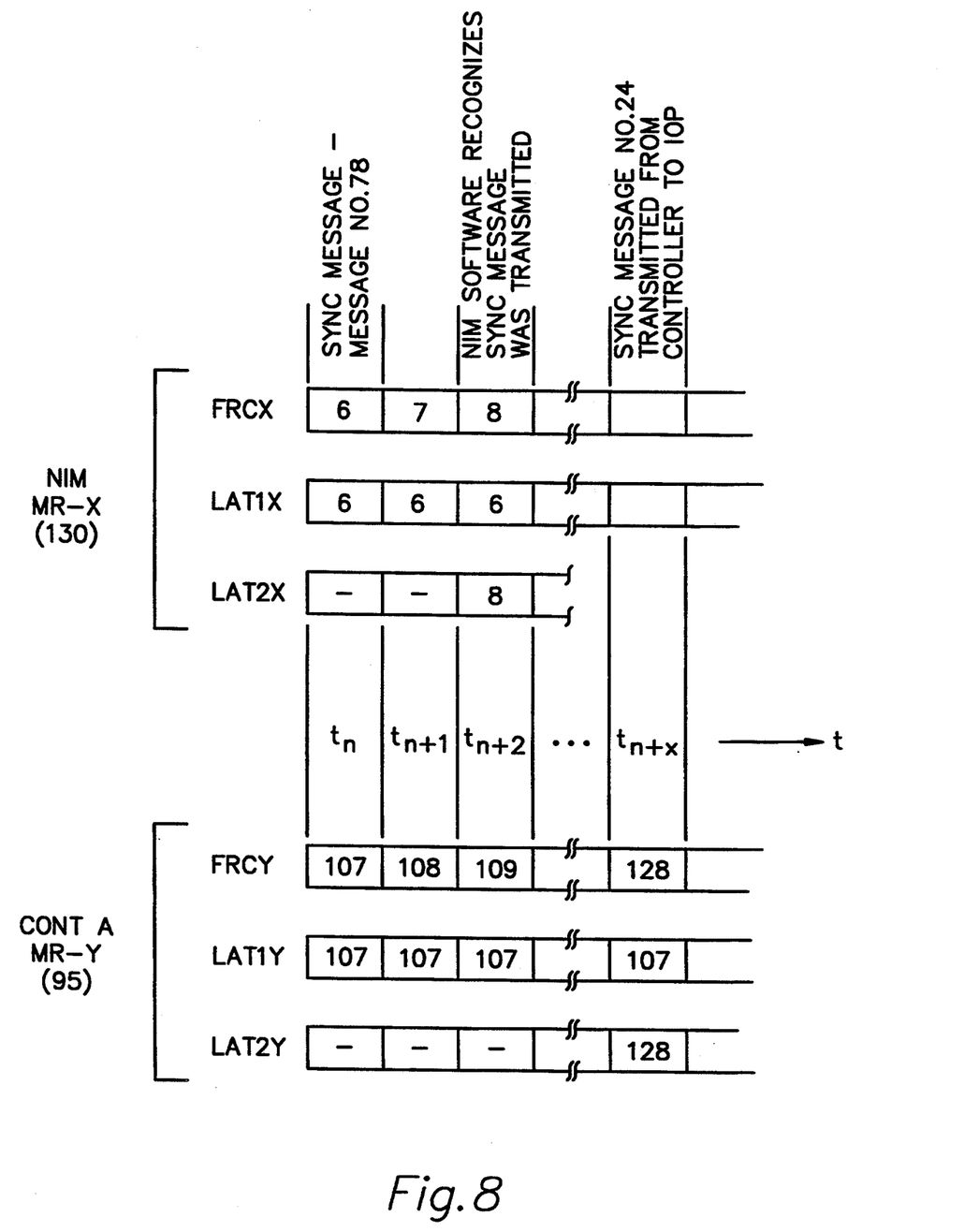
FIG. 8 shows a time line example of events which occur in the synchronizing of two networks.

Referring to FIG. 8, there is shown a time line example of the events which occur in the synchronizing of the two networks, CONTIME being synchronized to LCNTIME. In the preferred embodiment every six seconds a synchronization message is transmitted by the NIM 602. The synchronization message has a format which is detectable by the message recognizer 130, 95 and further contains a message number. The message number is a sequential number which identifies the number of messages which have been transmitted. When the synchronization message is transmitted over the UCN 14, at time $t_n$, the message recognizer-X 130 and the message recognizer-Y 95 each detect that a synchronization message was transmitted/received, respectively. Thus, each first latch 310 latches the contents of the respective free running counter 305. Assume for purposes of example that the free running counter (FRCX) 305 of the message recognizer-X (MR-X) 130 has a value of 6 at the time the synchronization message is actually transmitted over the UCN 14, the synchronization message having a message number of 78. Since the actual transmission time over the UCN 14 is essentially zero, the first latch (LAT1X) of MR-X 130 latches the contents of FRCX such that the contents of LAT1X is also a 6. Further, the first latch (LAT1Y) 310 of the message recognizer (MR-Y) 95 latches the contents of the free running counter (FRCY) 305 of the MR-Y 95, such that in this example the contents of FRCY and LAT1Y are both 107, the time of the actual transmission of the synchronization message over the UCN 14 occurring at time $t_n$.

Assume in this example at $t_{n+1}$ nothing occurs. Again in this example at $t_{n+2}$, the control software of the NIM 602 recognizes that a synchronization message was transmitted. The control software of the NIM 602 reads the current value of the clock-X, i.e., LCNTIME, and causes the second control signal CONT2 of the MR-X 130 to be generated such that the contents of the second latch (LAT2X) of the MR-X 130 contains the value of 8, the current value of FRCX 305. The NIM 602 then calculates the real time the sync message was transmitted in accordance with the following formula:

TIMESYNC=CLOCK X−(LAT2X−LAT1X).

This time, denoted as LCNTIME1, is the real time that the message having serial number 78 was transmitted. The NIM 602 sends a second message to the controller 30 which includes the value of TIMESYNC and the message number in this example the message number was 78. This message has a format such that it is not recognized by either message recognizer 130, 95. Upon receipt of this second message the controller associates the contents of LAT1Y with LCNTIME1 thereby synchronizing the controller to the LCNTIME. Thus the time synchronization of the preferred embodiment of the present invention is a two message pair. Thus, for the controller 30 in this example, the value in LAT1Y corresponds to LCNTIME1. Someone skilled in the art would recognize that the two message pair could be implemented in one message type by including the real time of the previous sync in the data field of the next sync message.

Asynchronously, every two second in the preferred embodiment of the present invention, a synchronization message is transmitted by the controller 30 over the bus (I/O link) 22 to the IOP 21. At some time, LCNTIME 2, the sync message is sent over the I/O link 22. At the time that the sync message is transmitted by the I/O link 22 the second latch (LAT2Y) 311 of MR-Y 95 is caused to latch the contents of the FRCY 305 by the I/O interface 80. In the example, the FRCY 305 has a value of 128 and the contents stored in LAT2Y is also 128 as a result of the latching process. The sync message to the IOP 21 also contains a message number (the message number is 24 in this example), the message number to the IOP being independent of the message numbers received from the NIM 602. The controller 30 calculates LCNTIME2, the time the sync message was sent to the IOP as follows:

LCNTIME2=LCNTIME1+(LAT2Y−LAT1Y).

The IOP resets a time counter maintained in the IOP; thus, LCNTIME2 corresponds to zero time in the IOP 21. Thus a time base is established for the I/O link 22. When the IOP 21 detects an event change on one of the inputs from the field devices, the occurrence of the event is associated with a value in the time counter maintained in the IOP. At some time when the controller requests data from the IOP (recall in the preferred embodiment of the present system that the IOP 21 only responds to request from the controller), the IOP transmits to the controller the input point of the event, the value of the time counter when the digital event occurred, plus the message number of the sync ID message. Thus in this example the message number will have a message ID of 24, the sync time will have the value of the time counter maintained in the IOP when the event occurred, and the point number will correspond to the input point (if the IOP has 32 inputs, the point number will have a value of between 1 to 32 depending on the input point of-the event. The input point is associated with the function of the event which was read. When the controller receives the information the controller adds the value of the time counter maintained in the IOP to the LCNTIME2 to obtain the actual time of the occurrence of the event. Thus the IOP is also sync to the LCNTIME.

U.S. Pat. No. 5,168,443 describes a communication scheme between a controller 30 and an IOP utilizing message numbers, entitled "Method for Providing Redundancy of a High Speed Pulse Input I/O Processor", this patent being assigned to the same assignee as the present application. The preferred embodiment of the present invention describes a method and apparatus for providing time synchronization of data transmitted between devices of bus type local area networks. In addition an alternative method is described in which the real time is maintained by a master device (the controller) rather than in the slave device (IOP). It will be obvious to one skilled in the art that the timed synchronization process between the controller and the IOP can be implemented in the same fashion as the synchronization between the LCN network and the controller by including the message recognizer apparatus internal to the IOP's.

While there has been shown what is considered the preferred embodiment of the present invention, it will be manifest that many changes and modifications can be made therein without departing from the essential spirit and scope of the invention. It is intended, therefore, in the annexed claims to cover all such changes and modifications which fall within the true scope of the invention.

I claim:

1. A method for synchronizing the time of a second network to a first network, each network having an independent timing subsystem for maintaining its own real time, the method comprising the steps of:
    for the first network
    a) sending a first message to the second network, the first message being uniquely identified as a sync message;
    b) obtaining a first relative time within the first network of when the first message is transmitted;
    c) when the first network recognizes that the first message was sent, obtaining a second relative time to send a second message to the second network containing a real time of the first network that the first message was sent;
    for the second network
    d) obtaining a third relative time within the second network of when the first message is received; and
    e) associating the real time of the first network contained in the second message to the third relative time, thereby synchronizing the time of the second network to the time of the first network and eliminating any skew of time associated with transmission protocols of the first and second network.

2. A method for synchronizing according to claim 1, further comprising:
    for the first network
    a) including a message ID number in the first and second message; and
    for the second network
    b) checking the message ID number of the first and second message to insure a valid association of the real time of the second message to the third relative time.

3. A method for synchronizing the time of a second network to a first network, each network having an independent timing subsystem for maintaining its own real time, the method comprising the steps of:
    for the first network a) sending a first message to the second network, the first message being uniquely identified as a sync message;
b) obtaining a first relative time within the first network of when the first message is transmitted; for the second network
c) setting a second relative time within the second network to zero of when the first message is received; and
d) when data is transmitted to the first network, transmitting data to the first network via a second message along with the second relative time associated with the data such that the first network can correlate the real time of the first network to the second relative time associated with the data.

4. An apparatus for synchronizing the time of a second network to a first network, each network having an independent timing subsystem for generating its own real time, respectively, comprising;
   a) a first free running counter for generating relative time within the first network;
   b) a second free running counter for generating relative time within the second network;
   c) a first and second latch associated with the first network for recording a first and second relative time value, respectively, from the first free running counter in response to a first and second control signal, respectively;
   d) a third latch associated with the second network for recording a third relative time value from the second free running counter in response to a third control signal;
   e) first means, associated with the first network, for detecting when a first message is transmitted to the second network, the first message containing a message ID number, to generate the first control signal;
   f) third means, associated with the second network, for detecting when the first message is received from the first network, to generate the third control signal; and
   g) second means, associated with the first network, for recognizing that the first message was transmitted to generate the second control signal to record the second relative time value, and to transmit a second message to the second network, the second message including the message ID number, and the real time of the first network when the first message was transmitted, such that the second network associates the real time of the first network received in the second message to the third relative time, thereby synchronizing the time of the second network to the time of the first network.

5. An apparatus for synchronizing the time of a second and third network to a first network, each network having an independent timing subsystem for generating its own real time, respectively, comprising;
   a) a first free running counter for generating relative time within the first network;
   b) a second free running counter for generating relative time within the second network;
   c) a first and second latch associated with the first network for recording a first and second relative time value, respectively, from the first free running counter in response to a first and second control signal, respectively;
   d) a third and fourth latch associated with the second network for recording a third relative time value from the second free running counter in response to a third and fourth control signal;
   e) first means, associated with the first network, for detecting when a first message is transmitted to the second network, the first message containing a message ID number, to generate the first control signal;
   f) third means, associated with the second network, for detecting when the first message is received from the first network, to generate the third control signal; and
   g) second means, associated with the first network, for recognizing that the first message was transmitted to generate the second control signal to record the second relative time value, and to transmit a second message to the second network, the second message including the message ID number, and the real time of the first network when the first message was transmitted, such that the second network associates the real time of the first network received in the second message to the third relative time, thereby synchronizing the time of the second network to the time of the first network; and
   h) fourth means, associated with the second network, for outputting a third message to generate the fourth control signal and to indicate a time synchronization message, the fourth control signal being generated when said fourth message is outputted, causing the third network to initialize a fifth relative time within the third network to zero, and data transmitted from the third network to the second network including a value of the fifth relative time associated with the data, causing the second network to correlate the time of the data of the third network to the time of the second and first networks.

* * * * *